United States Patent
McReynolds (12)

(10) Patent No.: US 6,608,592 B2
(45) Date of Patent: Aug. 19, 2003

(54) LOCATION SYSTEM USING BEACON TRANSMITTERS

(75) Inventor: Alan Andrew McReynolds, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/053,811

(22) Filed: Jan. 18, 2002

(65) Prior Publication Data

US 2003/0137455 A1 Jul. 24, 2003

(51) Int. Cl.[7] .............................. G01S 3/52; G01S 1/24; G01S 3/02
(52) U.S. Cl. ........................ 342/418; 342/387; 342/464
(58) Field of Search ................................ 342/387, 406, 342/418, 464, 465

(56) References Cited

U.S. PATENT DOCUMENTS 3,631,495 A  * 12/1971 Redlich ...................... 342/406
3,999,187 A  * 12/1976 Johnson ...................... 342/406
4,106,023 A  *  8/1978 Baghdady ................... 342/405
5,977,913 A  * 11/1999 Christ ......................... 342/465
6,268,829 B1 *  7/2001 Weckstrom ................. 342/418

OTHER PUBLICATIONS

Websigns: Hyperlinking Physical Locations to the Web, S. Pradhan et al., Computer, vol. 34(8), p. 42–48, Aug. 2001.*

* cited by examiner

Primary Examiner—Thomas H. Tarcza
Assistant Examiner—T H Mull

(57) ABSTRACT

A location system includes a plurality of beacon transmitters each positioned at a respective location. Each beacon transmitter includes a plurality of antennas positioned in a circular arrangement. Each beacon transmitter is configured to transmit an identification signal having a plurality of reference data and to transmit a directional signal from the plurality of antennas by selecting one of the antennas at a time in sequence around the circular arrangement to simulate a rotating antenna. The location system further includes a receiver configured to receive the identification signals and a plurality of Doppler-shifted directional signals each corresponding to one of the directional signals, wherein the receiver is configured to generate a plurality of time data for each received Doppler-shifted directional signal, and wherein the receiver is configured to determine a location of the receiver using each received Doppler-shifted directional signal, each time data, and each identification signal.

34 Claims, 8 Drawing Sheets

LOCATION SYSTEM USING BEACON TRANSMITTERS

BACKGROUND OF THE INVENTION

1. Field of the Invention

The present invention generally relates to location systems. More particularly, the present invention relates to determining a location of a receiver.

2. Related Art

There are several conventional location systems. Each conventional location system has particular advantages and disadvantages with respect to indoor applications. These conventional location systems enable the determination of the location of a receiver, whereas the receiver may be any type of electronic device.

A first conventional location system utilizes one or more base stations to determine the location of a receiver. A first base station transmits a signal. The receiver receives the signal and retransmits the signal to the first base station. The first base station calculates the phase angle difference between the original transmitted signal and the retransmitted signal to determine the distance between the first base station and the receiver. A similar process is performed between the receiver and other base stations to determine the location of the receiver.

Unfortunately, in indoor applications the first conventional location system may inaccurately determine the location of the receiver because of the multipath reflections problem. In particular, the base station may receive a first retransmitted signal which reflected off several surfaces before arriving at the base station (long path case), may receive a second retransmitted signal which reflected off a few surfaces before arriving at the base station (medium path case), and may receive a third retransmitted signal which reflected off no surfaces before arriving at the base station (short path case). Thus, the base station may inaccurately calculate the distance between the base station and the receiver depending on which retransmitted signal (i.e., long path case, medium path case, or short path case) is received.

A second conventional location system utilizes beacon transmitters which use infrared (IR) technology to communicate with the receiver and determine the location of the receiver. However, the receiver must be close to the IR beacon transmitter. Moreover, the transmit IR cone and the receive IR cone between the receiver and IR beacon transmitter must intersect. Furthermore, large scale distribution of the IR beacon transmitters is expensive (since IR communication is feasible only over a short distance) and requires extensive maintenance for the large number of IR beacon transmitters needed for the large scale distribution.

In addition, a third conventional location system uses GPS signals to determine the location of the receiver. Unfortunately, the GPS signals are too weak and inaccurate to provide a reliable determination of the location of the receiver in indoor applications.

Furthermore, a fourth conventional location system uses time of flight techniques to determine the location of the receiver. A time of flight location system using radio frequency (RF) exists but requires tricky timing correlation. Moreover, with standard modulation schemes, multipath interference may introduce significant errors. An acoustic time of flight location system is much simpler. However, it is of limited use in indoor applications due to sound obstruction. Safety concerns limit the power and thus the range of acoustic systems. Present implementations involve stations placed on a four foot grid, representing a tremendous installation and maintenance cost.

Moreover, a fifth conventional location system utilizes a signal fading scheme implemented using existing radio channels or using yet approved radio channels to determine the location of the receiver. This location system has low accuracy and in many cases needs to be trained.

SUMMARY OF THE INVENTION

A location system is described. The location system includes a plurality of beacon transmitters each positioned at a respective location. Each beacon transmitter includes a plurality of antennas positioned in a circular arrangement, wherein each beacon transmitter is configured to transmit an identification signal having a plurality of reference data and to transmit a directional signal from the plurality of antennas by selecting one of the antennas at a time in sequence around the circular arrangement to simulate a rotating antenna.

Moreover, the location system further includes a receiver configured to receive the plurality of identification signals and a plurality of Doppler-shifted directional signals each corresponding to one of the directional signals, wherein the receiver is configured to generate a plurality of time data for each received Doppler-shifted directional signal, and wherein the receiver is configured to determine a location of the receiver using each received Doppler-shifted directional signal, each time data, and each identification signal.

BRIEF DESCRIPTION OF THE DRAWINGS

The accompanying drawings, which are incorporated in and form a part of this specification, illustrate embodiments of the invention and, together with the description, serve to explain the principles of the present invention.

The drawings referred to in this description should not be understood as being drawn to scale except if specifically noted.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

LOCATION SYSTEM

Figure 1:
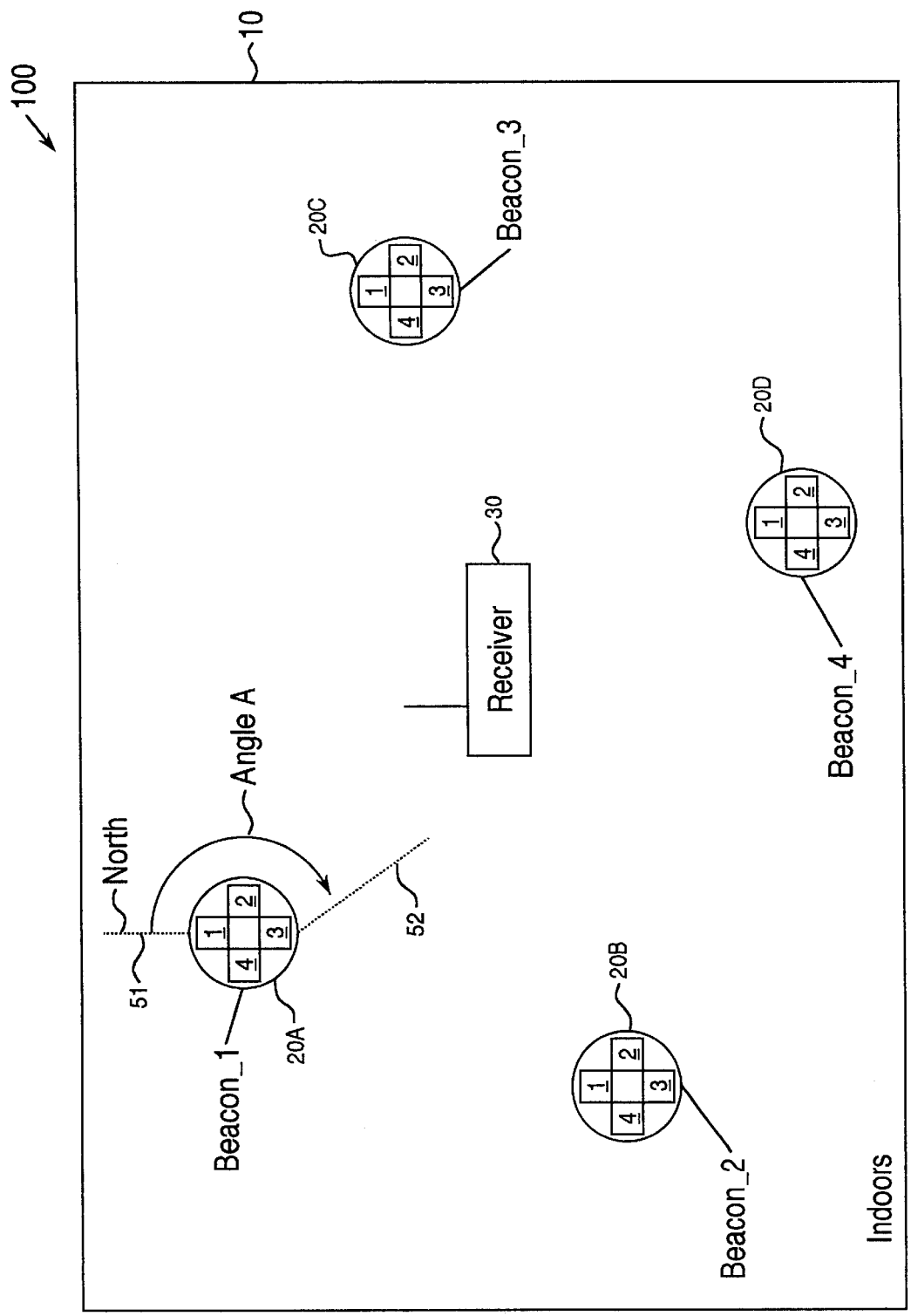
FIG. 1 illustrates a location system in accordance with an embodiment of the present invention.

FIG. 1 illustrates a location system 100 in accordance with an embodiment of the present invention. The location system 100 enables the determination of a location of a receiver 30 using a plurality of beacon transmitters 20A–20D positioned at various locations. The location system 100 is well suited for short range applications such as indoor applications. For example, the location system 100 may be deployed within an indoor environment 10 such as a building, a structure, or any indoor facility. It should be understood that the location system 100 can be utilized in short to medium range outdoor applications and in a combination of indoor and outdoor applications, as well. Moreover, the location system 100 provides a low cost and compact solution for determining the location of the receiver 30.

The location system 100 utilizes radio frequency (RF) signals. In particular, each beacon transmitter 20A–20D transmits an identification signal that is encoded with a plurality of reference data such as the respective location of the beacon transmitter and a reference direction (e.g., north 51). Moreover, each beacon transmitter 20A–20D generates and transmits a directional signal from an antenna structure (e.g., 1, 2, 3, and 4) that simulates a rotating antenna. The directional signal may be a low power signal.

The receiver 30 receives the identification signal and a Doppler-shifted directional signal corresponding to the directional signal transmitted from a particular one (e.g., beacon transmitter 20A) of the beacon transmitters 20A–20D and generates time data for the Doppler-shifted directional signal. Then, the receiver 30 determines its angle (e.g., angle A) with respect to the particular beacon transmitter using the identification signal, the Doppler-shifted directional signal, and the time data, whereas the determined angle (e.g., angle A) has an origin side 51 at the reference direction (e.g., north 51) and a terminal side 52 that points at the receiver 30. The reference direction can be any direction. Similarly, the receiver 30 receives the identification signal and the Doppler-shifted directional signal transmitted by one or more additional beacon transmitters (e.g., beacon transmitter 20B, beacon transmitter 20C, and beacon transmitter 20D) and determines each angle with respect to the additional beacon transmitters. Generally, by determining a first angle with respect to a first beacon transmitter and a second angle with respect to a second beacon transmitter, the receiver 30 can determine its location using the first and second angles and the respective locations of the first and second beacon transmitters, as well as using any of a variety of mathematical techniques such as triangulation. In some cases, the receiver 30 may need to determine its location using the signals transmitted by more than two beacon transmitters to resolve any ambiguity or inconsistency in the calculation of its location.

As illustrated in FIG. 1, the location system 100 includes a plurality of beacon transmitters 20A–20D positioned at various locations within the indoor environment 10 such as a building, a structure, or any indoor facility. Although the location system 100 depicted in FIG. 1 has four beacon transmitters 20A–20D, it should be understood the location system 100 can have more than or less than four beacon transmitters, whereas the number of beacon transmitters is dependent on the size of the indoor environment 10 and the desired accuracy for the determination of the receiver's 30 location.

Moreover, each beacon transmitter 20A–20D has multiple antennas (e.g., 1, 2, 3, and 4) positioned in a circular arrangement. Moreover, each beacon transmitter 20A–20D is configured to transmit the identification signal encoded with a plurality of reference data, whereas the identification signal is a modulated RF signal. The reference data can include a rotation rate (as will be describe below) and a reference direction (e.g., north 51) for calculating the angle (e.g., angle A) with respect to the beacon transmitter. In addition, the reference data can include a respective location of the beacon transmitter to enable the receiver 30 to use any of a variety of mathematical techniques, such as triangulation, to determine its location from the signals transmitted by the beacon transmitter. Moreover, the reference data can include a beacon transmitter ID value and a time value representing a time gap between the transmission of the identification signal and the transmission of the directional signal.

In addition, each beacon transmitter 20A–20D is configured to transmit the directional signal by selecting one of the multiple antennas (e.g., 1, 2, 3, and 4) at a time in sequence around the circular arrangement to simulate the rotating antenna. Unlike the identification signal, the directional signal is an unmodulated RF signal and is transmitted at a particular frequency or tone. The rotation rate (i.e., N degrees per second) indicates the rate at which the beacon transmitter sweeps through the individual antennas in the circular arrangement. In an embodiment, the rotation rate is a relatively low value. By transmitting the directional signal in this manner, the receiver 30 receives the Doppler-shifted directional signal which corresponds to the directional signal. In particular, the Doppler-shifted directional signal represents the directional signal whose transmission frequency (or tone) increases and decreases from the receiver's 30 perspective as the directional signal is transmitted by the antenna structure that simulates the rotating antenna. Moreover, the rise and fall in the transmission frequency of the directional signal is related to the transmission direction in which the selected transmitting antenna (e.g., 1, 2, 3, or 4) points relative to the direction of the receiver 30 as each one of the antennas (e.g., 1, 2, 3, and 4) is selected one at a time in sequence around the circular arrangement.

Figure 2:
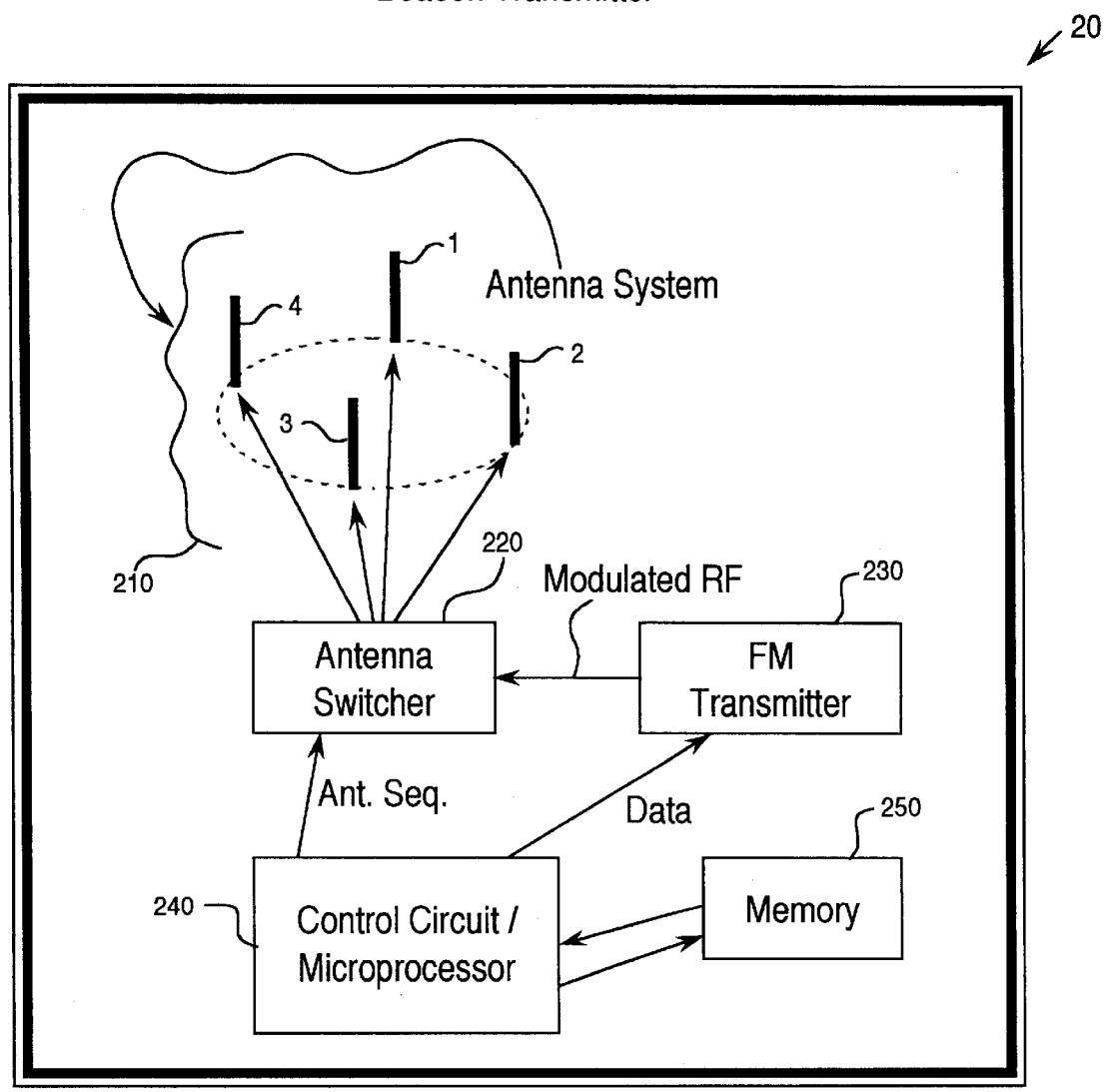
FIG. 2 illustrates a beacon transmitter in accordance with an embodiment of the present invention.

FIG. 2 illustrates a beacon transmitter 20 in accordance with an embodiment of the present invention. It should be understood that each beacon transmitter 20A–20D of FIG. 1 can be implemented as illustrated in FIG. 2. Moreover, it should be understood that the beacon transmitter 20 can have other configurations. The beacon transmitter 20 includes an antenna system 210. The antenna system 210 has four antennas 1–4. It should be understood that the antenna system 210 can have more than four antennas or can have less than four antennas. The accuracy of the location system 100 (FIG. 1) is increased by increasing the number of antennas in the antenna system 210. In an embodiment, one of the antennas 1–4 is selected to transmit the identification signal, whereas the directional signal is transmitted by selecting one of the antennas (e.g., 1, 2, 3, and 4) at a time in sequence around the circular arrangement to simulate the rotating antenna. The directional signal can be transmitted by sweeping through the antennas 1–4 once at the rotation rate. Alternatively, the directional signal can be transmitted by sweeping through the antennas 1–4 multiple times at the rotation rate. The identification signal could also be transmitted on all N antennas at the same time, whereas N is the number of antennas in the antenna system 210.

In an embodiment, the beacon transmitter 20 further includes an antenna switcher 220, a FM transmitter 230, a control circuit/microprocessor 240, and a memory device 250. For transmitting the directional signal, the antenna switcher 220 selects one of the antennas (e.g., 1, 2, 3, and 4) at a time in sequence around the circular arrangement to simulate the rotating antenna. The FM transmitter 230 outputs, based on inputted data, the identification signal for transmission by the antenna system 210, whereas the identification signal is a modulated RF signal. Unlike the identification signal, the directional signal is an unmodulated RF signal and is transmitted at a particular frequency or tone. Moreover, the memory device 250 provides storage capability for the beacon transmitter 210. In addition, the control circuit/microprocessor 240 is configured to control the operation of the beacon transmitter 20. In particular, the control circuit/microprocessor 240 provides the antenna selection sequence data to the antenna switcher 220 and sends data to be modulated to the FM transmitter 230. Moreover, the control circuit/microprocessor 240 controls the transmission of the identification signal and the directional signal.

Figure 3:
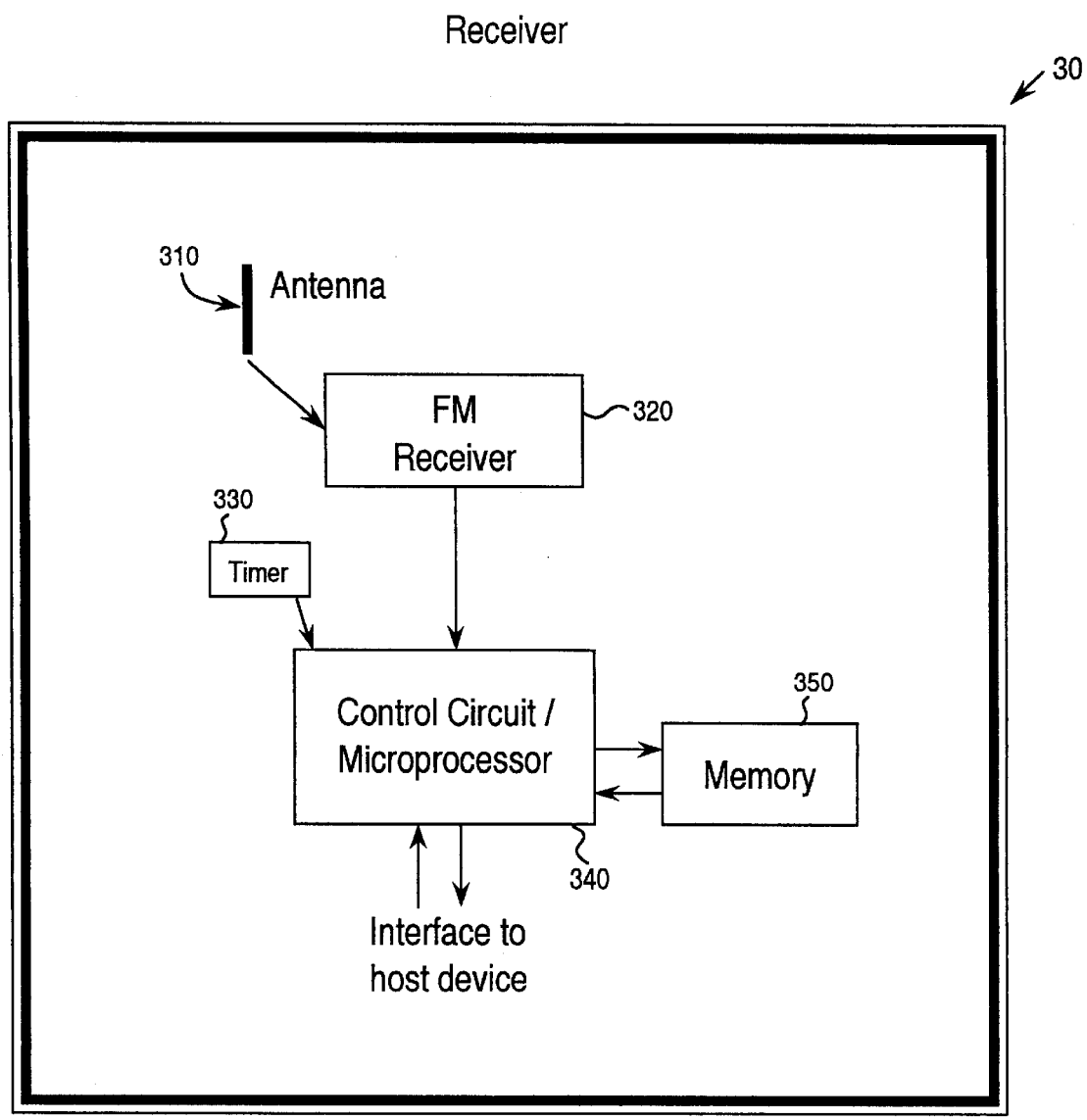
FIG. 3 illustrates a receiver in accordance with an embodiment of the present invention.

FIG. 3 illustrates a receiver 30 in accordance with an embodiment of the present invention. In an embodiment, the receiver 30 includes an antenna 310, a FM receiver 320, a timer 330, a control circuit/microprocessor 340, and a memory device 350. The antenna 310 receives the identification signal and the Doppler-shifted directional signal corresponding to the directional signal transmitted by any of the beacon transmitters 20A–20D (FIG. 1). Moreover, the FM receiver 320 is coupled to the antenna 310. The FM receiver 320 outputs a demodulated identification signal which is encoded with the reference data. In addition, the FM receiver 320 outputs a demodulated representation of the Doppler-shifted directional signal, whereas the demodulated representation shows the location of a minimum Doppler-shift of the Doppler-shifted directional signal. Before the Doppler-shifted directional signal is received by the receiver 30, the timer 330 is initiated to generate time data for the Doppler-shifted directional signal. Moreover, the memory device 350 provides storage capability for the receiver 30. In an embodiment, the receiver 30 can be interfaced with a host device.

The control circuit/microprocessor 340 can decode the reference data encoded into the identification signal. Furthermore, by determining the minimum Doppler-shift of the Doppler-shifted directional signal and by determining the time data associated with the minimum Doppler-shift of the Doppler-shifted directional signal, the control circuit/microprocessor 340 can determine the angle of the receiver 30 relative to the beacon transmitter that transmitted the received identification signal and the received Doppler-shifted directional signal. In particular, the relationship among the angle (e.g., angle A of FIG. 1) of the receiver 30 relative to a beacon transmitter, the rotation rate (Rate) of the antenna system of the beacon transmitter, and the time difference (T) between the time data associated with the start of the Doppler-shifted directional signal and the time data associated with the minimum Doppler-shift of the Doppler-shifted directional signal is as follows:

$$\text{angle} = (\text{Rate})(T) \qquad \text{(Eq. 1)}$$

whereas the angle is in degrees, the rotation rate is in N degrees per second, and the time difference is in seconds. It should be understood that the receiver 30 can have other configurations.

In practice, a receiver 30 utilizes the location system 100 (FIG. 1) to determine its location within the indoor environment 10 such as a building, a structure, or any indoor facility where the location system 100 (FIG. 1) is deployed. First, the receiver 30 receives the reference signal from a first beacon transmitter. Then, the receiver 30 receives a Doppler-shifted directional signal corresponding to the directional signal transmitted by the first beacon transmitter, whereas the receiver 30 generates a plurality of time data for the received Doppler-shifted directional signal. The receiver 30 determines a first angle of the receiver 30 relative to the first beacon transmitter using the received Doppler-shifted directional signal, the time data, and the identification signal which provides the reference data. In a similar manner, the receiver 30 determines the angle of the receiver 30 relative to one or more additional beacon transmitters. Furthermore, the receiver 30 determines its location using the determined angles with respect to several beacon transmitters and the respective locations of the beacon transmitters.

Figure 4:
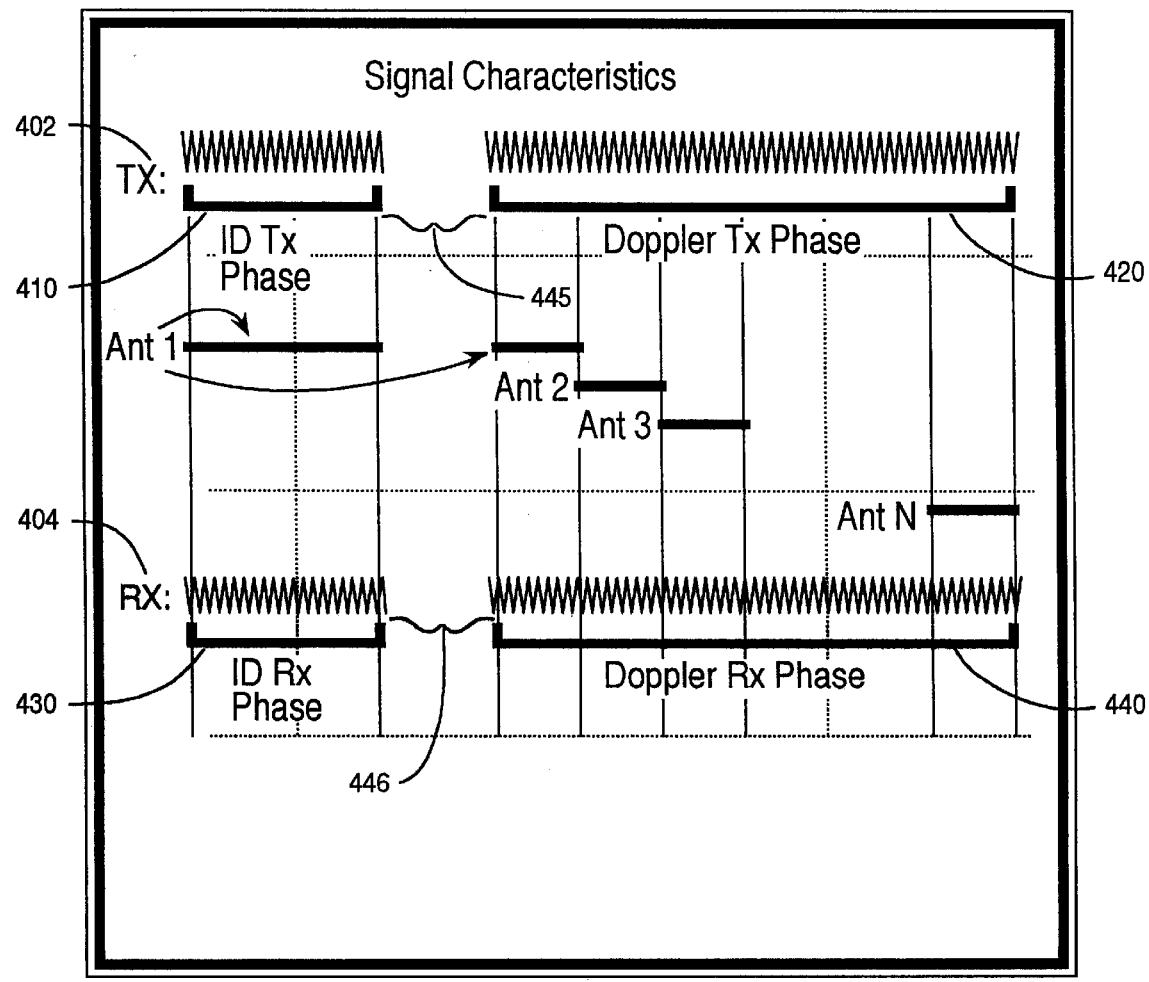
FIG. 4 Illustrates a plurality of signals transmitted by a location system in accordance with an embodiment of the present invention.

FIG. 4 illustrates a plurality of signals transmitted by a location system in accordance with an embodiment of the present invention. As illustrated in FIG. 4, during an ID transmission phase 410, the beacon transmitter 402 transmits the identification signal using antenna 1. The beacon transmitter 402 transmits the directional signal during a Doppler transmission phase 420. The time gap 445 provides the receiver 404 sufficient time to lock onto the transmission frequency of the directional signal. The time gap 445 between the ID transmission phase 410 and the Doppler transmission phase 420 may be eliminated. As described above, the beacon transmitter 402 transmits the directional signal by selecting one of the antennas (e.g., 1, 2, 3, and 4) at a time in sequence around a circular arrangement to simulate a rotating antenna. In particular, the beacon transmitter 402 first uses the antenna 1 to transmit the directional signal. Then, the beacon transmitter switches to antenna 2 and transmits the directional signal from antenna 2. The directional signal is transmitted in a 30 similar manner from the other antennas. The directional signal can be transmitted by sweeping through the antennas 1–4 once at the rotation rate. Alternatively, the directional signal can be transmitted by sweeping through the antennas 1–4 multiple times at the rotation rate.

As illustrated in FIG. 4, during an ID reception phase 430, the receiver 404 receives the identification signal using its antenna. The receiver 404 receives the Doppler-shifted directional signal using its antenna during a Doppler reception phase 440. The time gap 446 provides the receiver 404 sufficient time to lock onto the transmission frequency of the directional signal. The time gap 446 between the ID reception phase 430 and the Doppler reception phase 440 may be eliminated.

Figure 5:
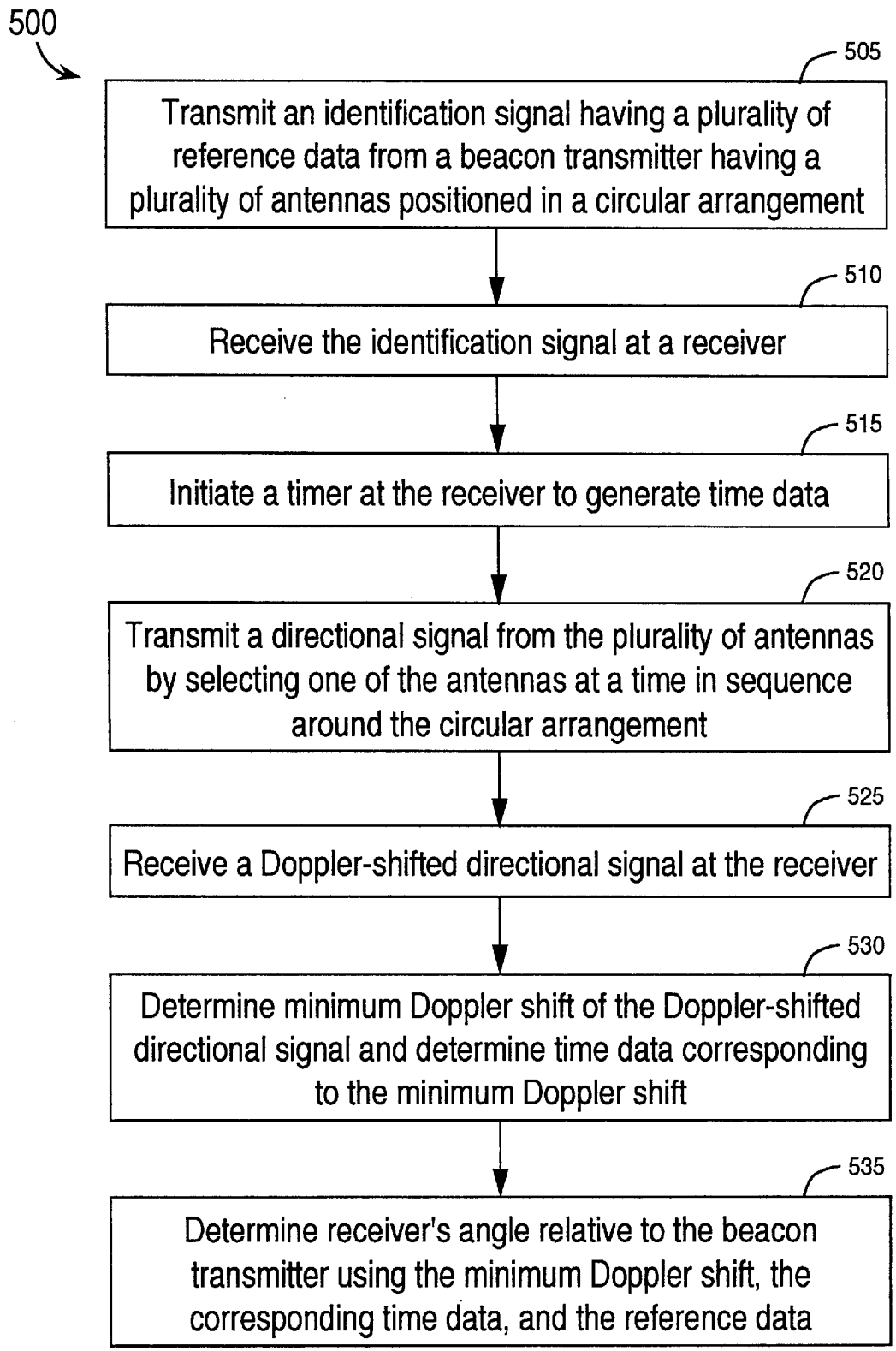
FIG. 5 illustrates a flow chart showing a method of enabling the determination of a location of a receiver in accordance with an embodiment of the present invention.

FIG. 5 illustrates a flow chart showing a method 500 of enabling the determination of a location of a receiver 30 in accordance with an embodiment of the present invention. Reference is made to FIGS. 1–4. In particular, a receiver 30 is located within range of the location system 100 (FIG. 1)

within the indoor environment 10 such as a building, a structure, or any indoor facility where the location system 100 (FIG. 1) is deployed.

At Block 505, a beacon transmitter (e.g., beacon transmitter 20A) transmits an identification signal having a plurality of reference data. As described above, the beacon transmitter 20A has a plurality of antennas positioned in a circular arrangement. The reference data can include a rotation rate of the antenna system 210 (FIG. 2) and a reference direction (e.g., north 51 of FIG. 1) for calculating the angle (e.g., angle A of FIG. 1) with respect to the beacon transmitter 20A. In addition, the reference data can include a respective location of the beacon transmitter 20A to enable the receiver 30 to use any of a variety of mathematical techniques, such as triangulation, to determine its location from the signals transmitted by the beacon transmitter 20A. Moreover, the reference data can include a beacon transmitter ID value and a time value representing a time gap between the transmission of the identification signal and the transmission of the directional signal.

Figure 7:
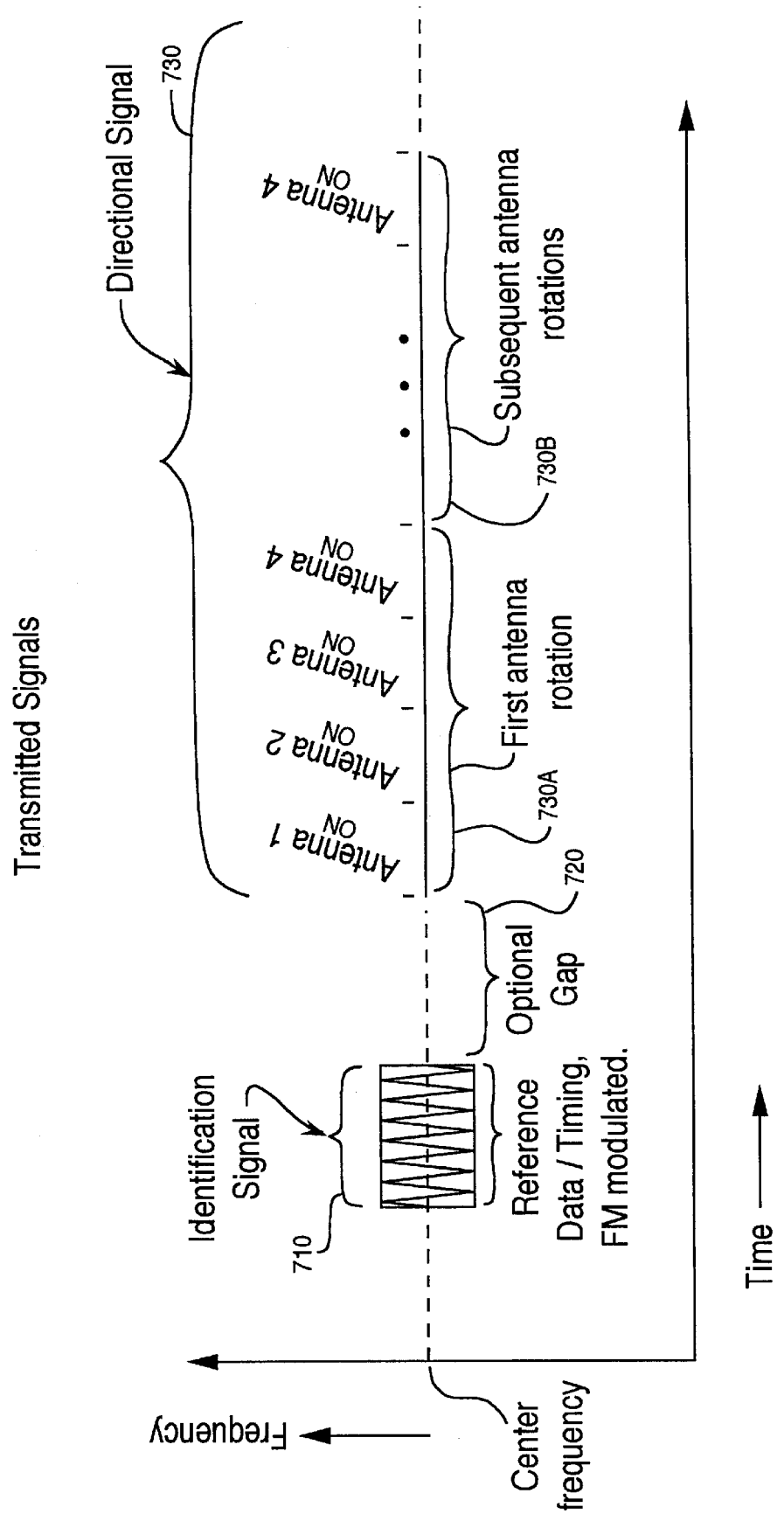
FIG. 7 illustrates a plurality of transmitted signals in accordance with an embodiment of the present invention.

FIG. 7 illustrates a plurality of transmitted signals in accordance with an embodiment of the present invention. As depicted in FIG. 7, the identification signal 710 transmitted by the beacon transmitter 20A is a modulated signal.

Figure 8:
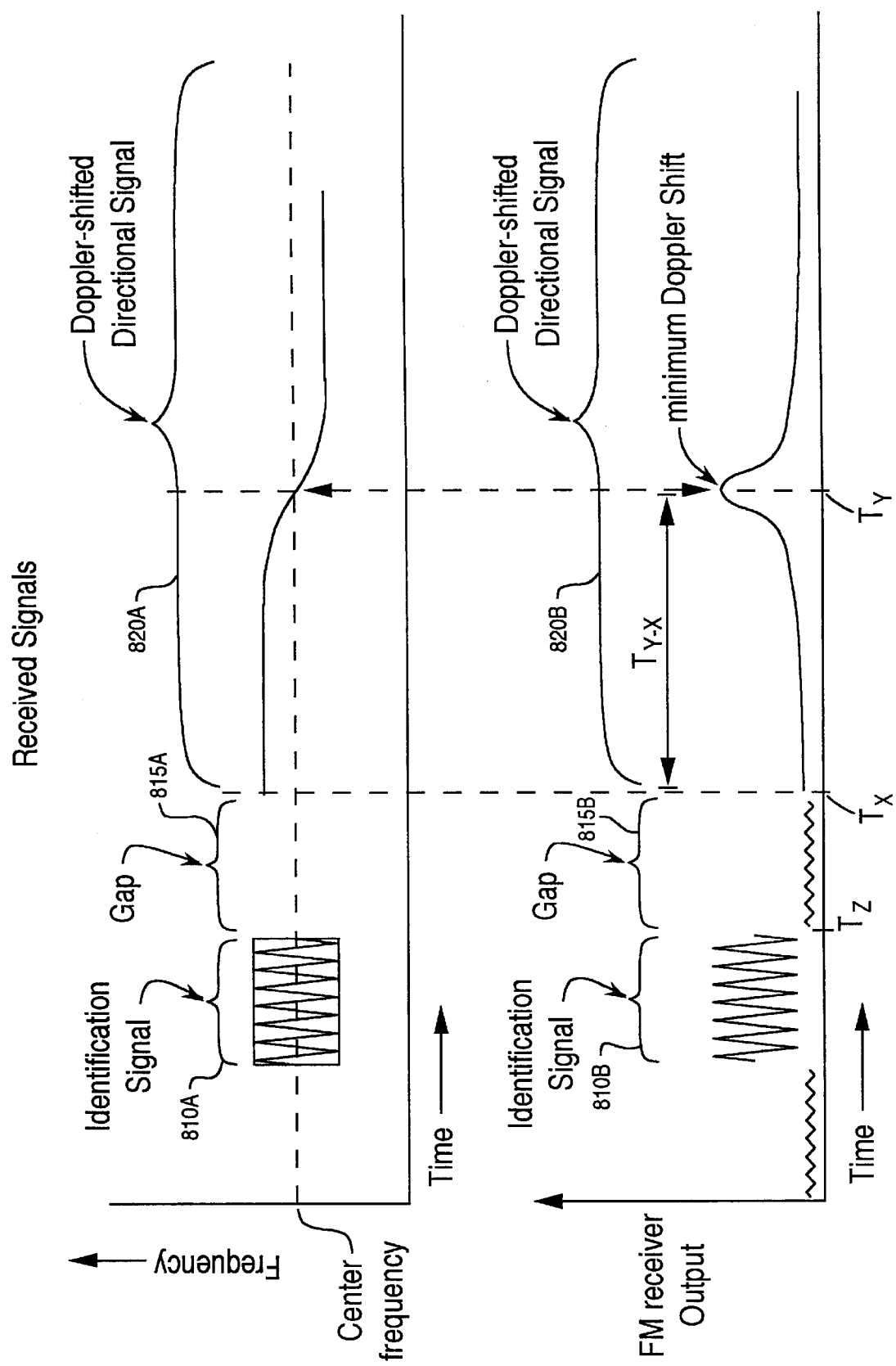
FIG. 8 illustrates a plurality of received signals in accordance with an embodiment of the present invention.

At Block 510, the receiver 30 receives the identification signal. FIG. 8 illustrates a plurality of received signals in accordance with an embodiment of the present invention. The received identification signal 810A is depicted in FIG. 8 before being sent to the FM receiver 320 (FIG. 3) of the receiver 30, showing that the received identification signal 810A is modulated about a center frequency. Moreover, the identification signal 810B represents the output of the FM receiver 320.

Continuing with Block 515, the receiver 30 initiates the timer 330 (FIG. 3) to generate time data for the Doppler-shifted directional signal corresponding to the directional signal transmitted by the beacon transmitter 20A. In an embodiment, the beacon transmitter 20A provides a time gap 720 (FIG. 7) before transmitting the directional signal. Alternatively, the beacon transmitter 20A transmits the directional signal immediately after transmitting the identification signal 710 (FIG. 7).

At Block 520, the beacon transmitter 20A transmits the directional signal by selecting one of the antennas (e.g., 1, 2, 3, and 4) at a time in sequence around the circular arrangement to simulate the rotating antenna. As depicted in FIG. 7, the directional signal 730 transmitted by the beacon transmitter 20A is an unmodulated signal transmitted at the center frequency. The directional signal 730 can be transmitted by sweeping through the antennas 1–4 once at the rotation rate as represented by the first antenna rotation 730A. Alternatively, the directional signal can be transmitted by sweeping through the antennas 1–4 multiple times at the rotation rate as represented by the first antenna rotation 730A and the subsequent antenna rotations 730B.

Furthermore, at Block 525, the receiver 30 receives the Doppler-shifted directional signal corresponding to the directional signal transmitted by the beacon transmitter 20A after the time gap 815A. The received Doppler-shifted directional signal 820A is depicted in FIG. 8 before being sent to the FM receiver 320 (FIG. 3) of the receiver 30, showing that the frequency of the received Doppler-shifted directional signal 820A drifts about a center frequency due to the Doppler shift effect. Moreover, the Doppler-shifted directional signal 820B represents the output of the FM receiver 320.

At Block 530, the receiver 30 uses its control circuit/microprocessor 340 (FIG. 3) to determine the minimum Doppler shift of the Doppler-shifted directional signal 820B (FIG. 8) and to determine the time data corresponding to the minimum Doppler shift. As depicted in FIG. 8, the peak of the Doppler-shifted directional signal 820B (FIG. 8) at the output of FM receiver 320 corresponds to the minimum Doppler shift of the Doppler-shifted directional signal 820B (FIG. 8). Moreover, the time of the minimum Doppler shift also corresponds to the time at which the frequency of the received Doppler-shifted directional signal 820A (FIG. 8) is closest to the center frequency. In addition, the minimum Doppler shift corresponds to the case where the selected transmitting antenna of the beacon transmitter 20A is pointing approximately towards the receiver 30. The time $T_y$ represents the time at which the minimum Doppler shift occurs. The time $T_x$ represents the time of the start of the Doppler-shifted directional signal 820B (FIG. 8). In addition, the time difference $T_{y-x}$ can be used to determine the angle of the receiver 30 relative to the beacon transmitter 20A by using the following:

$$\text{angle} = (\text{Rate})\,(T_{y-x}) \tag{Eq. 2}$$

whereas the angle is in degrees, the rotation rate (Rate) is in N degrees per second, and the time difference ($T_{y-x}$) is in seconds.

Moreover, at Block 535, the receiver 30 uses its control circuit/microprocessor 340 (FIG. 3) and Eq. 2 to determine the angle (e.g., angle A of FIG. 1) of the receiver 30 relative to the beacon transmitter 20A using the minimum Doppler shift, the corresponding time data, and the reference data of the identification signal, whereas the reference data includes the rotation rate (Rate) and the reference direction (e.g., north 51 of FIG. 1). It is predicted that the angle can be determined with an accuracy of 3–5 degrees with the beacon transmitter transmitting using the 900 MHz band or the 2.4 GHz band and having four antennas and a radio range of 100's of feet. Moreover, its predicted that this beacon transmitter can be implemented on a 8"×8" board which can fit within a coffee can sized package.

Figure 6:
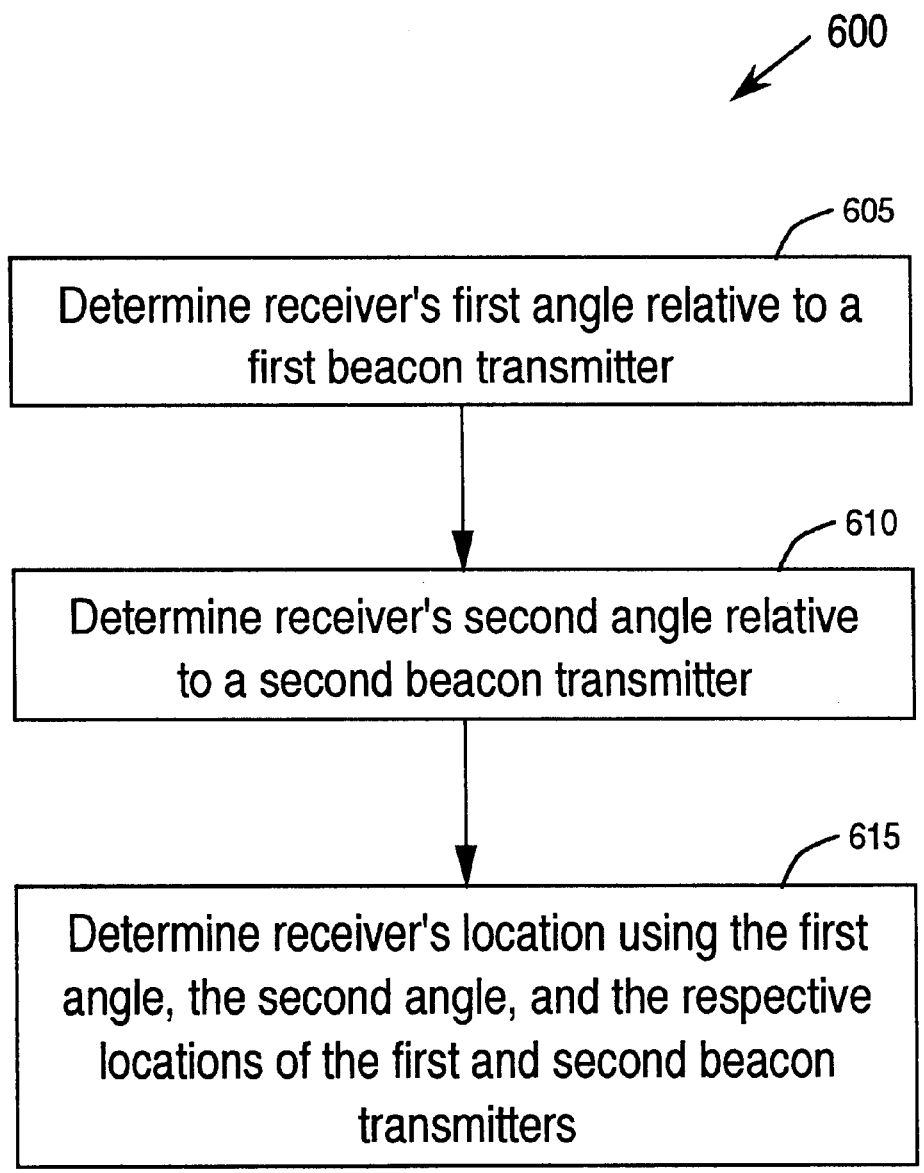
FIG. 6 illustrates a flow chart showing a method of determining a location of a receiver in accordance with an embodiment of the present invention.

FIG. 6 illustrates a flow chart showing a method 600 of determining a location of a receiver 30 in accordance with an embodiment of the present invention. Reference is made to FIGS. 1–5 and 7–8. In particular, a receiver 30 is located within range of the location system 100 (FIG. 1) within the indoor environment 10 such as a building, a structure, or any indoor facility where the location system 100 (FIG. 1) is deployed.

At Block 605, the receiver 30 determines the angle of the receiver 30 relative to a first beacon transmitter using the method described in FIG. 5. Moreover, at Block 610, the receiver 30 determines the angle of the receiver 30 relative to a second beacon transmitter using the method described in FIG. 5.

Furthermore, at Block 615, the receiver 30 determines its location using the first and second angle, the respective locations of the first and second beacon transmitters provided in the reference data, the reference directions (e.g., north) of the first and second beacon transmitters provided in the reference data, and any of a variety of mathematical techniques such as triangulation. In some cases, the receiver 30 may need to determine its location using the signals transmitted by more than two beacon transmitters to resolve any ambiguity or inconsistency in the calculation of its location. These cases may arise when the receiver 30 lies on a direct line between two beacon transmitters. It is predicted that the location can be calculated with a 2.5 meter resolution in a indoor environment 10 of approximately 60000 square feet using four beacon transmitters each having four antennas positioned in a circular arrangement.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A location system comprising:
   a plurality of beacon transmitters each positioned at a respective location, each beacon transmitter including a plurality of antennas positioned in a circular arrangement, wherein each beacon transmitter is configured to transmit an identification signal having a plurality of reference data and to transmit a directional signal from said plurality of antennas by selecting one of said antennas at a time in sequence around said circular arrangement to simulate a rotating antenna; and
   a receiver configured to receive said plurality of identification signals and a plurality of Doppler-shifted directional signals each corresponding to one of said directional signals, wherein said receiver is configured to generate a plurality of time data for each received Doppler-shifted directional signal, and wherein said receiver is configured to determine a location of said receiver using each received Doppler-shifted directional signal, each time data, and each identification signal.

2. A location system as recited in claim 1 wherein said receiver is configured to determine a minimum Doppler shift of each of said received Doppler-shifted directional signal and is configured to determine each time data corresponding to said minimum Doppler shift, wherein said receiver is configured to determine a plurality of angles of said receiver relative to each beacon transmitter using each minimum Doppler shift, each corresponding time data, and each reference data, and wherein said receiver is configured to determine said location of said receiver using each determined angle and each respective location of said beacon transmitters, wherein each reference data includes one of said respective locations of said beacon transmitters.

3. A location system as recited in claim 1 wherein each reference data includes one of said respective locations of said beacon transmitters, a reference direction, and a rotation rate associated with selecting one of said antennas at a time in sequence around said circular arrangement.

4. A location system as recited in claim 1 wherein said receiver includes an antenna, a FM receiver, and a timer, and wherein said receiver is configured to input each received Doppler-shifted directional signal into said FM receiver, and wherein said receiver is configured to determine a minimum Doppler shift of each received Doppler-shifted directional signal using output of said FM receiver.

5. A method of determining a location of a receiver, comprising:
   a) transmitting a first identification signal having a plurality of first reference data from a first beacon transmitter positioned at a first location and having a first plurality of antennas positioned in a first circular arrangement;
   b) receiving said first identification signal at said receiver having a timer;
   c) initiating said timer to generate a first time data;
   d) transmitting a first directional signal from said first plurality of antennas by selecting one of said antennas at a time in sequence around said first circular arrangement to simulate a rotating antenna;
   e) receiving a first Doppler-shifted directional signal at said receiver;
   f) determining a first minimum Doppler shift of said first Doppler-shifted directional signal and determining said first time data corresponding to said first minimum Doppler shift; and
   g) determining a first angle of said receiver relative to said first beacon transmitter using said first minimum Doppler shift, said corresponding first time data, and said first reference data.

6. A method as recited in claim 5 further comprising:
   h) transmitting a second identification signal having a plurality of second reference data from a second beacon transmitter positioned at a second location and having a second plurality of antennas positioned in a second circular arrangement;
   i) receiving said second identification signal at said receiver;
   j) initiating said timer to generate a second time data;
   k) transmitting a second directional signal from said second plurality of antennas by selecting one of said antennas at a time in sequence around said second circular arrangement to simulate said rotating antenna;
   l) receiving a second Doppler-shifted directional signal at said receiver;
   m) determining a second minimum Doppler shift of said second Doppler-shifted directional signal and determining said second time data corresponding to said second minimum Doppler shift;
   n) determining a second angle of said receiver relative to said second beacon transmitter using said second minimum Doppler shift, said corresponding second time data, and said second reference data; and
   o) determining said location of said receiver using said first angle, said second angle, and said first and second locations of said first and second beacon transmitters, wherein said first reference data includes said first location, and wherein said second reference data includes said second location.

7. A method as recited in claim 6 wherein said first reference data further includes a first reference direction, and a first rotation rate associated with selecting one of said antennas at a time in sequence around said first circular arrangement.

8. A method as recited in claim 6 wherein said second reference data further includes a second reference direction, and a second rotation rate associated with selecting one of said antennas at a time in sequence around said second circular arrangement.

9. A method as recited in claim 6 wherein said receiver includes a FM receiver, and wherein said step f) includes:
   inputting said first Doppler-shifted directional signal into said FM receiver; and
   determining said first minimum Doppler shift of said first Doppler-shifted directional signal using output of said FM receiver.

10. A method as recited in claim 9 wherein said step m) includes:
    inputting said second Doppler-shifted directional signal into said FM receiver; and determining said second minimum Doppler shift of said second Doppler-shifted directional signal using output of said FM receiver.

11. A method of providing directional information to enable determination of a location of a receiver, comprising;
   a) transmitting a first identification signal having a plurality of first reference data from a first beacon transmitter positioned at a first location and having a first plurality of antennas positioned in a first circular arrangement;
   b) transmitting a first directional signal from said first plurality of antennas by selecting one of said antennas at a time in sequence around said first circular arrangement to simulate a rotating antenna;
   c) receiving said first identification signal and a first Doppler-shifted directional signal at said receiver and generating at said receiver a first time data for said first Doppler-shifted directional signal;
   d) transmitting a second identification signal having a plurality of second reference data from a second beacon transmitter positioned at a second location and having a second plurality of antennas positioned in a second circular arrangement;
   e) transmitting a second directional signal from said second plurality of antennas by selecting one of said antennas at a time in sequence around said second circular arrangement to simulate said rotating antenna;
   f) receiving said second identification signal and a second Doppler-shifted directional signal at said receiver and generating at said receiver a second time data for said second Doppler-shifted directional signal; and
   g) determining said location of said receiver using said first reference data, said first Doppler-shifted directional signal, said first time data, said second reference data, said second Doppler-shifted directional signal, and said second time data.

12. A method as recited in claim 11 wherein said first reference data includes said first location of said first beacon transmitter, a first reference direction, and a first rotation rate associated with selecting one of said antennas at a time in sequence around said first circular arrangement.

13. A method as recited in claim 11 wherein said second reference data includes said second location of said second beacon transmitter, a second reference direction, and a second rotation rate associated with selecting one of said antennas at a time in sequence around said second circular arrangement.

14. A method as recited in claim 11 wherein said step g) includes:
   determining a first minimum Doppler shift of said first Doppler-shifted directional signal and determining said first time data corresponding to said first minimum Doppler shift;
   determining a first angle of said receiver relative to said first beacon transmitter using said first minimum Doppler shift, said corresponding first time data, and said first reference data;
   determining a second minimum Doppler shift of said second Doppler-shifted directional signal and determining said second time data corresponding to said second minimum Doppler shift;
   determining a second angle of said receiver relative to said second beacon transmitter using said second minimum Doppler shift, said corresponding second time data, and said second reference data; and
   determining said location of said receiver using said first angle, said second angle, and said, first and second locations of said first and second beacon transmitters, wherein said first reference data includes said first location, and wherein said second reference data includes said second location.

15. A method as recited in claim 11 wherein said receiver includes a FM receiver, and wherein said step g) further includes:
   inputting said first Doppler-shifted directional signal into said FM receiver;
   determining said first minimum Doppler shift of said first Doppler-shifted directional signal using output of said FM receiver;
   inputting said second Doppler-shifted directional signal into said FM receiver; and
   determining said second minimum Doppler shift of said second Doppler-shifted directional signal using output of said FM receiver.

16. An apparatus comprising:
   a first beacon transmitter positioned at a first location, said first beacon transmitter including a first plurality of antennas positioned in a first circular arrangement, wherein said first beacon transmitter is configured to transmit a first identification signal having a plurality of first reference data, and wherein said first beacon transmitter is configured to transmit a first directional signal from said first plurality of antennas by selecting one of said antennas at a time in sequence around said first circular arrangement to simulate a rotating antenna; and
   a receiver including an antenna, a FM receiver, and a timer, wherein said receiver is configured to receive said first identification signal and a first Doppler-shifted directional signal and is configured to generate a first time data for said first Doppler-shifted directional signal, wherein said receiver is configured to determine a first minimum Doppler shift of said first Doppler-shifted directional signal and is configured to determine said first time data corresponding to said first minimum Doppler shift, and wherein said receiver is configured to determine a first angle of said receiver relative to said first beacon transmitter using said first minimum Doppler shift, said corresponding first time data, and said first reference data.

17. An apparatus as recited in claim 16 further comprising:
   a second beacon transmitter positioned at a second location, said second beacon transmitter including a second plurality of antennas positioned in a second circular arrangement, wherein said second beacon transmitter is configured to transmit a second identification signal having a plurality of second reference data, and wherein said second beacon transmitter is configured to transmit a second directional signal from said second plurality of antennas by selecting one of said antennas at a time in sequence around said second circular arrangement to simulate said rotating antenna.

18. An apparatus as recited in claim 17 wherein said receiver is configured to receive said second identification signal and a second Doppler-shifted directional signal and is configured to generate a second time data for said second Doppler-shifted directional signal, wherein said receiver is configured to determine a second minimum Doppler shift of said second Doppler-shifted directional signal and is configured to determine said second time data corresponding to said second minimum Doppler shift, wherein said receiver is configured to determine a second angle of said receiver relative to said second beacon transmitter using said second minimum Doppler shift, said corresponding second time data, and said second reference data, and wherein said receiver is configured to determine said location of said receiver using said first angle, said second angle, and said first and second locations of said first and second beacon transmitters.

19. An apparatus as recited in claim 18 wherein said first reference data includes said first location, a first reference direction, and a first rotation rate associated with selecting one of said antennas at a time in sequence around said first circular arrangement.

20. An apparatus as recited in claim 18 wherein said second reference data includes said second location, a second reference direction, and a second rotation rate associated with selecting one of said antennas at a time in sequence around said second circular arrangement.

21. An apparatus as recited in claim 18 wherein said receiver is configured to input said first Doppler-shifted directional signal into said FM receiver, and wherein said receiver is configured to determine said first minimum Doppler shift of said first Doppler-shifted directional signal using output of said FM receiver, wherein said receiver is configured to input said second Doppler-shifted directional signal into said FM receiver, and wherein said receiver is configured to determine said second minimum Doppler shift of said second Doppler-shifted directional signal using output of said FM receiver.

22. A method of determining a location of a receiver, comprising;
    a) receiving at said receiver a plurality of identification signals each having a plurality of reference data and each transmitted by one of a plurality of beacon transmitters each positioned at a respective location and each having a plurality of antennas positioned in a circular arrangement;
    b) receiving at said receiver a plurality of Doppler-shifted directional signals each corresponding to one of a plurality of directional signals each transmitted by one of said beacon transmitters by selecting one of said antennas at a time in sequence around said circular arrangement to simulate a rotating antenna and generating at said receiver a plurality of time data for each received Doppler-shifted directional signal; and
    c) determining said location of said receiver using each received Doppler-shifted directional signal, each time data, and each identification signal.

23. A method as recited in claim 22 wherein said step c) includes:
    determining a minimum Doppler shift of each received Doppler-shifted directional signal and determining each time data corresponding to said minimum Doppler shift;
    determining a plurality of angles of said receiver relative to each beacon transmitter using each minimum Doppler shift, each corresponding time data, and each reference data of each identification signal; and
    determining said location of said receiver using each determined angle and each respective location of said beacon transmitters, wherein each reference data includes one of said respective locations of said beacon transmitters.

24. A method as recited in claim 22 wherein each reference data includes one of said respective locations of said beacon transmitters, a reference direction, and a rotation rate associated with selecting one of said antennas at a time in sequence around said circular arrangement.

25. A method as recited in claim 22 wherein said receiver includes a FM receiver, and wherein said step c) further includes:
    inputting each received Doppler-shifted directional signal into said FM receiver; and
    determining a minimum Doppler shift of each received Doppler-shifted directional signal using output of said FM receiver.

26. A method of transmitting signals for determining a location of a receiver, comprising;
    a) transmitting to said receiver from each one of a plurality of beacon transmitters one of a plurality of identification signals each having a plurality of reference data, wherein each beacon transmitter is positioned at a respective location and includes a plurality of antennas positioned in a circular arrangement; and
    b) transmitting to said receiver from each one of said beacon transmitters one of a plurality of directional signals by selecting one of said antennas at a time in sequence around said circular arrangement to simulate a rotating antenna; and
    c) generating at said receiver a plurality of time data for each received Doppler-shifted directional signal each corresponding to one of said plurality of directional signals and determining at said receiver said location using each received Doppler-shifted directional signal, each time data, and each identification signal.

27. A method as recited in claim 26 wherein said step c) includes:
    determining a minimum Doppler shift of each received Doppler-shifted directional signal and determining each time data corresponding to said minimum Doppler shift;
    determining a plurality of angles of said receiver relative to each beacon transmitter using each minimum Doppler shift, each corresponding time data, and each reference data of each identification signal; and
    determining said location of said receiver using each determined angle and each respective location of said beacon transmitters, wherein each reference data includes one of said respective locations of said beacon transmitters.

28. A method as recited in claim 26 wherein said receiver includes a FM receiver, and wherein said step c) further includes:
    inputting each received Doppler-shifted directional signal into said FM receiver; and
    determining a minimum Doppler shift of each received Doppler-shifted directional signal using output of said FM receiver.

29. A method as recited in claim 26 wherein each reference data includes one of said respective locations of said beacon transmitters, a reference direction, and a rotation rate associated with selecting one of said antennas at a time in sequence around said circular arrangement.

30. An apparatus comprising:
    a receiver configured to receive a plurality of identification signals each having a plurality of reference data, wherein said receiver is configured to receive a plurality of Doppler-shifted directional signals each corresponding to one of a plurality of directional signals and is configured to generate a plurality of time data for each received Doppler-shifted directional signal, and wherein said receiver is configured to determine a location of said receiver using each received Doppler-shifted directional signal, each time data, and each identification signal.

31. An apparatus as recited in claim 30 further comprising:
a plurality of beacon transmitters each configured to transmit one of said identification signals, wherein each beacon transmitter is positioned at a respective location and includes a plurality of antennas positioned in a circular arrangement, and wherein each beacon transmitter is configured to transmit one of said directional signals by selecting one of said antennas at a time in sequence around said circular arrangement to simulate a rotating antenna.

32. An apparatus as recited in claim 31 wherein said receiver is configured to determine a minimum Doppler shift of each received Doppler-shifted directional signal and to determine each time data corresponding to said minimum Doppler shift, wherein said receiver is configured to determine a plurality of angles of said receiver relative to each beacon transmitter using each minimum Doppler shift, each corresponding time data, and each reference data of each identification signal, wherein said receiver is configured to determine said location of said receiver using each determined angle and each respective location of said beacon transmitters, and wherein each reference data includes one of said respective locations of said beacon transmitters.

33. An apparatus as recited in claim 31 wherein each reference data includes one of said respective locations of said beacon transmitters, a reference direction, and a rotation rate associated with selecting one of said antennas at a time in sequence around said circular arrangement.

34. An apparatus as recited in claim 30 wherein said receiver includes a FM receiver, wherein said receiver is configured to input each received Doppler-shifted directional signal into said FM receiver, and wherein said receiver is configured to determine a minimum Doppler shift of each received Doppler-shifted directional signal using output of said FM receiver.

* * * * *